Aug. 30, 1960  L. A. HEINTZELMAN  2,950,731
DRAIN VALVE FOR COMPRESSED AIR RESERVOIR
Filed July 30, 1958
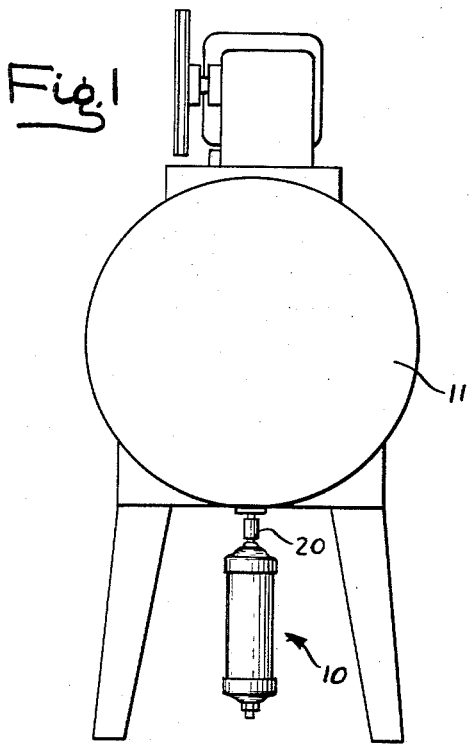
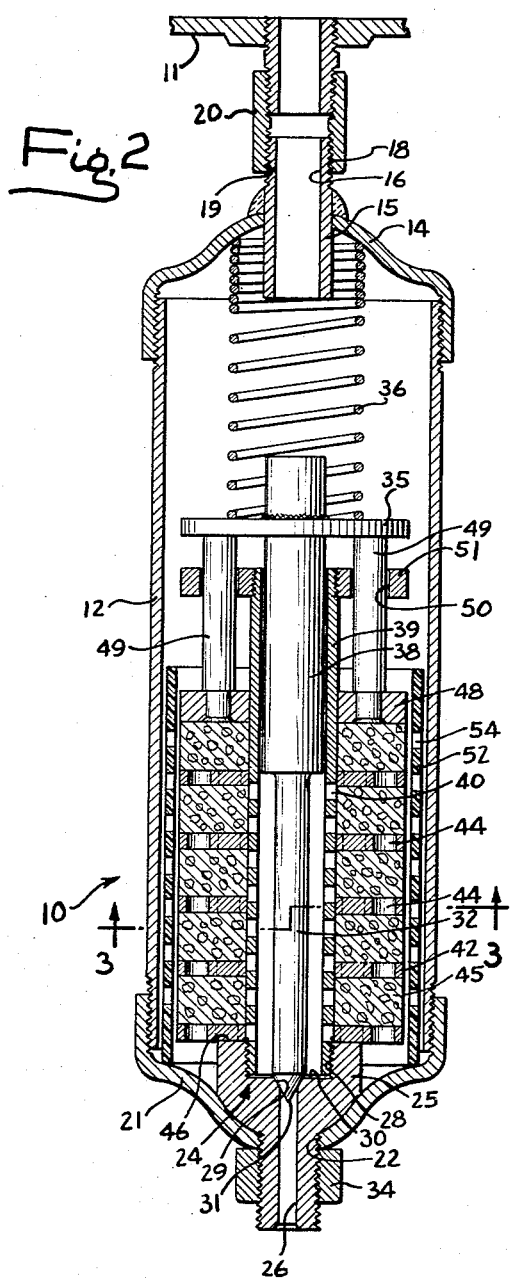
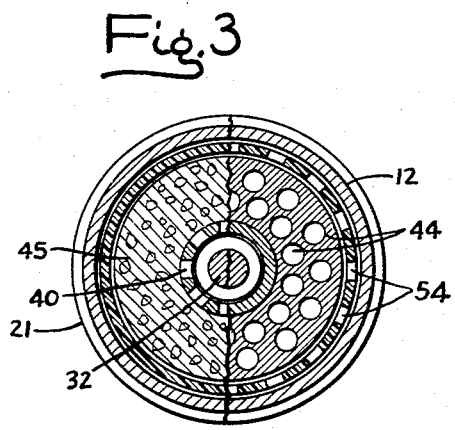
INVENTOR
LEO A. HEINTZELMAN
ATTYS

United States Patent Office 2,950,731
Patented Aug. 30, 1960

2,950,731

DRAIN VALVE FOR COMPRESSED AIR RESERVOIR

Leo A. Heintzelman, 4990 Burlingame SW., Grandville, Mich.

Filed July 30, 1958, Ser. No. 751,963

3 Claims. (Cl. 137—183)

The present invention relates to condensate drain valves finding particular but not exclusive utility for use with compressed air reservoirs. More particularly the invention relates to drain valves of the foregoing character which operate automatically to discharge liquids which collect in the reservoir.

In the operation of equipment which compresses gases such as air compressors, the above-atmospheric pressures encountered in compressing the air or other gas result in the condensation of liquids such as water. In order to prevent the collection of this water in large amounts and its consequent interference with the equipment in which the compressed gas is to be used, it is necessary to provide appropriate means for collecting and removing it from the system.

In compressing air for example, water in the atmosphere, as well as oil used to lubricate the compressor, commonly collects in the compressed air tank or reservoir, and it is for the removal of water condensate from such reservoirs that this invention finds particular utility.

One object of this invention is to provide an improved drain valve which when attached to a compressed air reservoir automatically effects the removal of water and other liquid accumulations therefrom.

Another object of the present invention is to provide a drain valve having the foregoing characteristics which operates independently of the air pressure in the reservoir to which it is attached, and which is sensitive to the accumulation of water therein so that it opens automatically when water collects in the reservoir and closes after the water has been discharged, and which requires a minimum of maintenance and attention.

A further object is to provide a drain valve of the above type which opens in response to the accumulation of water condensate and which, when the water has been discharged and begins to flow through the valve, closes to prevent the escape of air and a drop in pressure in the reservoir.

It is still another object to provide a drain valve of the above type which is readily attached to existing reservoirs, which is efficient and reliable in carrying out its operations, which is inexpensive both to manufacture and to install, and which is otherwise well adapted for its intended purpose.

Other objects and advantages will become apparent as the following description proceeds taken in connection with the accompanying drawing wherein:

Figure 1 illustrates the application of a condensate discharge device illustrative of the present invention to the reservoir of an air compressor unit.

Fig. 2 is an enlarged vertical cross section of the condensate discharge device shown in Fig. 1.

Fig. 3 is a section view taken substantially in the plane of line 3—3 of Fig. 2.

While an illustrative drain valve embodying the features of the present invention has been shown in the drawing and will be described below in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

A condensate discharge valve illustrative of the present invention, indicated generally in the drawing by the numeral 10, is attached to the lower portion of a compressed air reservoir 11 or other similar tank or chamber into which compressed gases are supplied. In one common application, the reservoir is employed for compressed air which is to be used for operating air driven equipment such as air tools, air brake systems, and the like. Compressed air is supplied to the reservoir by an air compressor (not shown) which filters and compresses atmospheric air. Under most conditions of operation, moisture is present in the air being compressed, and at the compression pressures tends to condense into liquid form and accumulate in the reservoir along with entrained oil from the compressor.

For purposes of collecting such condensate as tends to collect within the reservoir 11 and prevent this liquid from passing into the air outlet or otherwise remaining in and corroding the reservoir tank, there is provided a water trap or chamber 12 depending from the reservoir. As shown in the drawing, one such trap is in the form of an elongated cylindrical housing having a cap-like portion 14 having welded or otherwise secured thereto a nipple or sleeve 15 defining an inlet opening 16. The sleeve is formed with external threads 18 for engagement with corresponding threads 19 on a nipple 20 depending from the lower surface of the tank 11. All joints in the present construction are preferably threaded to assist in providing a pressure tight seal, and appropriate gaskets or other sealing agents may be employed if desired.

In the lower end of the chamber 12 is a cap-like portion 21 defining an outlet opening 22 through which the discharge of accumulated condensate is controlled by means of an appropriate valve structure such as a needle valve shown generally at 24. To this end there is fixed within the outlet opening 22 a valve seat member 25 having a bore 26 extending therethrough and terminating at its inner end in a counterbore 28. An annular valve seat 29 is defined in the shoulder 30 between the outlet bore 26 and the counterbore 28 and cooperates with a pointed conical end 31 of a valve stem 32 to open or close the outlet bore 26. The seat member 25 can be mounted tightly in place in the cap-like portion 21 by any suitable means, for example by a nut 34 threaded on the end of the member 25 opposite from the counterbore 28 and projecting through the outlet opening 22 of the cap-like portion 21 as shown in the drawing for purposes of illustration.

The pointed end 31 of the valve stem 32 is urged against the valve seat 29 for closing the outlet bore 26 by the application of a biasing force thereto. For example, in the illustrative valve construction the stem is formed with a flange 35 adjacent its upper end and a valve closing force is exerted against this flange by a helical coil spring 36 compressed between the flange and the cap portion 14 of the housing. Additionally, air pressure in the reservoir 11 and housing 12 will exert a small force on the valve stem, depending on the difference in exposed upper and lower areas of the valve stem and flange, tending to close the valve. And also the weight of the valve stem will assist in closing the valve opening. The last two factors are, however, minor compared to the force exerted by the spring. With the foregoing construction the valve is normally closed in the absence of condensate thereby preventing the escape of compressed air from the reservoir.

For purposes of guiding the valve stem for axial movement in opening or closing the valve bore 26, the stem is provided with an enlarged upper end portion 38 adjacent the flange 35 which fits closely within a sleeve 39 mounted in the housing 12 and providing a sliding guide support for the stem. The sleeve member 39 is threadably engaged at one end in the counterbore 28 and extending inwardly therefrom into the housing 12. So that water collecting in the chamber can be discharged through the valve, the sleeve 39 is perforated with numerous holes 40 through its lower portion, that is through the end thereof proximate to the threaded engagement with the seat member 25. In this manner, when the valve is open water can pass through the perforations 40 into the annular space thus defined between the sleeve 39 and the valve stem and flow out through the bore 26 past the valve seat 29. The conical end 31 of the valve stem 32 and seat 29 are smoothly machined to provide a fluid and air-tight seal when the point 31 is seated. The stem 32 and seat member 25 may be of any suitable construction and material to provide the desired valve characteristics.

In accordance with the present invention, provision is made for opening the valve 24 in response to the accumulation of water in the chamber 12, allow substantially all of the water to be discharged under the pressure of the compressed air, and then close to prevent the escape of air. This valve operation is accomplished automatically and independently of the air pressure by means which are sensitive to the pressure of water and which can provide, even with only a small amount of water, a force sufficient to open the valve against the force of the spring.

Accordingly, for operating the valve there is provided a water expansible compressed material which, when contacted with water, forceably expands and is capable of exerting a controllable force on the valve stem. To this end the device embodies a plurality of metal spacer discs 42 having appropriate holes 44 loosely surrounding the perforated sleeve 39 so as to be capable of sliding relative thereto. Interspersed between these discs are annular spools or plugs 45 of a compressed material having the above described characteristics of water expansibility.

For supporting the stack of spools and spacer discs, the bottom-most perforated metal spacer disc 42 rests on the inner end 46 of the valve seat element 25 and serves as a stop for the water expansible spools 45.

For purposes of operating the valve stem upon an expansion of the spools, an upper disc 48 is provided on the stack of spools and spacers having a pair of spaced pins 49 engaged with the valve stem flange 35. These pins are preferably guided by appropriately alined apertures 50 in a guide flange 51 secured to the inner end of the sleeve 39. It will be appreciated by those skilled in the art that the forces acting on the valve spool must necessarily be balanced so that the valve is closed after the water condensate has been discharged. Accordingly, the force exerted by the spring, slightly greater than the force of expansion of the spools in the absence of water so that the valve will remain closed, and slightly less when water is present in the chamber 12 so that the valve will open.

In order for the valve to operate properly the compressed material must be sufficiently porous not only to absorb water but to allow the water to be driven out and thereby be dried by the compressed air as it drives out the water when the valve is open. In addition to having a porous water expansible spool, it will be appreciated that the perforations in the sleeve are preferably arranged towards the outlet end of the chamber, that is the perforation density is greater towards the lower or outlet end of the sleeve 39. The upper spools will then be dried as the air forces the water into the lower portion of the cylinder 12, and the lowermost spools will be dried as the remains of the water is forced out of the valve. When the water has been driven out of the chamber, the expansible spools will be sufficiently dry to be recompressed by the spring 36 and the differential air pressure and thereby allow the valve to close. Loss of air pressure is thus kept at a minimum as the accumulation of water condensate in the chamber is periodically discharged.

One material which is shown in the drawing and which has operated successfully as a porous water expansible spool 45 is compressed cellulose sponge cut to an annular shape corresponding in diameter to the perforated discs and compressed in place between the spacer discs. In place of the sponge, it will be recognized by those skilled in the art that other water expansible materials may be employed, among which materials are, wood (especially balsa and gum), goldbeater's skin, rawhide, whalebone, animal hair, asbestos, silk thread and paper mache. These materials, when formed as porous spools and tightly compressed and placed between the perforated discs effectively expand in contact with water and open the valve. In order to contain the lateral edges of the compressed spools 45 of water expansible material, a plastic impregnated, perforated fiber glass sleeve 52 having appropriate perforations 54 is desirably employed around the compressed spools 45 and perforated spacer discs 42.

In some instances it may be desirable to perforate the compressed spools of water expansible material 40 in order to facilitate their drying and thereby the closing of the valve 24. Should it ever become necessary to replace the expansible material, this is readily done by simply unscrewing the lower cap-like portion 21 of the chamber 12 and removing the valve unit by unscrewing either the perforated center tube 39 from the seat member 25, or removing the guide flange 51 from the tube.

It will be appreciated that the condensate discharge device described is capable of completely automatic operation when once installed and operates substantially independently of the air pressure in the reservoir, thereby eliminating the problem of periodic manual discharge of condensate and the undesirable effects of too great an accumulation of water in the reservoir.

I claim as my invention:

1. An automatic condensate drain valve for a compressed air reservoir, comprising, an elongated cylindrical housing defining a chamber having at one end an inlet passage communicating with the reservoir and at the other end an outlet passage, a valve seat member in said outlet passage having a surface thereon defining a valve seat, a perforated sleeve extending within said housing and fixed at one end to said member, a valve stem slidably supported in said sleeve and having an end cooperable with said seat to close said outlet passage, said valve stem extending through said sleeve and terminating in a flange, a spring acting between said flange and the housing for biasing said valve stem to close said outlet passage, a plurality of perforated annular spacer discs slidably positioned in spaced relation on said perforated sleeve, spools of porous water expansible material interposed between said discs and capable of expanding when contacted with water which collects in said housing, and means operatively connecting said spools to said valve flange so that said flange is moved against the force of said spring to open said valve in response to an expansion of said water expansible means thereby to discharge through said outlet passage the water in said housing which caused said expansion.

2. An automatic condensate drain valve for a compressed air reservoir, comprising, an elongated cylindrical housing defining a chamber having at one end an inlet passage communicating with the reservoir and at the other end an outlet passage, a valve seat member in said outlet passage having a surface thereon defining a valve seat, a perforated sleeve extending within said housing and fixed at one end to said member, a valve stem slidably supported in said sleeve and having an end cooperable with said seat to close said outlet passage, said valve stem extending through said sleeve and terminating in a flange, a spring acting between said flange and the housing for biasing said valve stem to close said outlet passage, a plurality of perforated annular spacer discs slidably positioned in spaced relation on said perforated sleeve, spools of porous water expansible material interposed between said discs and capable of expanding when contacted with water which collects in said housing, a plurality of pins fixed to the innermost one of said discs and extending into engagement with the valve flange, and means fixed on the innermost end of said sleeve including apertures guidably receiving said pins whereby said spools are operatively connected to said valve flange so that said flange is moved against the force of said spring to open said valve in response to an expansion of said water expansible means thereby to discharge through said outlet passage the water in said housing which caused said expansion.

3. An automatic condensate drain valve for a compressed air reservoir, comprising, an elongated cylindrical housing defining a chamber having at one end an inlet passage communicating with the reservoir and at the other end an outlet passage, a valve seat member in said outlet passage having a surface thereon defining a valve seat, a perforated sleeve extending within said housing and fixed at one end to said member, a valve stem slidably supported in said sleeve and having an end cooperable with said seat to close said outlet passage, said valve stem extending through said sleeve and terminating in a flange, a spring acting between said flange and the housing for biasing said valve stem to close said outlet passage, a plurality of perforated annular spacer discs slidably positioned in spaced relation on said perforated sleeve, a second perforated sleeve surrounding said perforated sleeve and discs, spools of porous water expansible material interposed between said discs within said second sleeve and capable of expanding when contacted with water which collects in said housing, and means operatively connecting said spools to said valve flange so that said flange is moved against the force of said spring to open said valve in response to an expansion of said water expansible means thereby to discharge through said outlet passage the water in said housing which caused said expansion.

References Cited in the file of this patent
UNITED STATES PATENTS

| | | |
|---|---|---|
| 565,457 | Harttert | Aug. 11, 1896 |
| 1,903,745 | Lawler | Apr. 11, 1933 |
| 1,954,911 | Bahnson | Apr. 17, 1934 |
| 2,068,416 | Knight | Jan. 19, 1937 |
| 2,842,152 | Winter | July 8, 1958 |